United States Patent [19]

Nohira et al.

[11] 4,210,105
[45] Jul. 1, 1980

[54] INTERNAL COMBUSTION ENGINE INJECTED ACCUMULATION CHAMBER

[75] Inventors: Hidetaka Nohira, Mishima; Sumio Ito, Susono; Hisashi Oki, Numazu, all of Japan

[73] Assignee: Toyota Jidosha Kogyo Kabushiki Kaisha, Toyota, Japan

[21] Appl. No.: 905,016

[22] Filed: May 11, 1978

[30] Foreign Application Priority Data

Jan. 17, 1978 [JP] Japan .................................. 53-2676

[51] Int. Cl.$^2$ ........................ F02B 3/00; F02D 39/02
[52] U.S. Cl. .................................. 123/277; 123/295; 123/316; 123/559
[58] Field of Search ................. 123/75 E, 75 C, 75 B, 123/119 C, 32 SP, 32 ST, 124 R, 26, 105

[56] References Cited

U.S. PATENT DOCUMENTS

| | | | |
|---|---|---|---|
| 1,648,929 | 11/1927 | Zaikowsky | 123/75 B |
| 1,649,700 | 11/1927 | Jobes | 123/75 B |
| 2,652,039 | 9/1953 | Weslake | 123/75 B |
| 3,580,231 | 5/1971 | Bradbury | 123/75 B |
| 3,967,595 | 7/1976 | Yagi et al. | 123/32 SP |
| 4,020,817 | 5/1977 | Noguchi et al. | 123/32 SP |
| 4,023,543 | 5/1977 | Ishikawa | 123/32 SP |
| 4,062,333 | 12/1977 | Matsuda et al. | 123/119 C |

Primary Examiner—Ira S. Lazarus
Assistant Examiner—Magdalen Moy
Attorney, Agent, or Firm—Kenyon & Kenyon

[57] ABSTRACT

Disclosed is an internal combustion engine comprising a combustion chamber and an accumulation chamber which are interconnected to each other via an accumulation valve. The opening operation of the accumulation valve is controlled so that the accumulation valve remains opened during the compression stroke. Fuel is fed into the accumulation chamber to form therein a rich mixture. In the first half of the compression stroke, a jet of the rich mixture is spouted out into the combustion chamber from the accumulation chamber to stratify the inside of the combustion chamber so that the rich mixture is collected around the spark plug. In the latter half of the compression stroke, a lean mixture in the combustion chamber flows into the accumulation chamber to accumulate the mixture under high pressure, which is spouted out into the combustion chamber at the next cycle, in the accumulation chamber.

8 Claims, 13 Drawing Figures

INTERNAL COMBUSTION ENGINE INJECTED ACCUMULATION CHAMBER

DESCRIPTION OF THE INVENTION

The present invention relates to an internal combustion engine.

At present, in the field of internal combustion engines, it is an important goal to improve the thermal efficiency while reducing the amount of harmful components in exhaust gas. As a method of effectively reducing the amount of harmful components in exhaust gas, there has been known a method of simultaneously reducing the amount of harmful HC, CO and $NO_x$ components in the exhaust gas by using a lean air-fuel mixture, and; there has also been known a method of reducing the amount of harmful $NO_x$ components in the exhaust gas by recirculating the exhaust gas into the intake system of an engine. However, in either case wherein a lean air-fuel mixture or a mixture containing the recirculated exhaust gas therein is used, there occurs a common problem in that, since the flame speed of such a mixture is very low and, thus, the burning velocity is low, a high thermal efficiency cannot be obtained and, as a result, a satisfactory high output of an engine cannot be obtained. Consequently, in the case wherein a lean air-fuel mixture or a mixture containing the recirculated exhaust gas therein is used, in order to improve thermal efficiency, the most important objective is to increase the flame speed. As a means of effectively increasing the burning velocity of the combustible mixture in the combustion chamber, an engine has been proposed by us, in which an accumulation chamber is formed in the cylinder head for temporarily accumulating a part of the suction gas introduced into the combustion chamber from the intake system of an engine and, in addition, the accumulation chamber is connected to the combustion chamber via an accumulation valve. In this engine, the accumulation valve remains opened over a crank angle ranging from the beginning of the compression stroke to the end of the compression stroke, so that the suction gas accumulated in the accumulation chamber is spouted out into the combustion chamber. This suction gas thus spouted causes a strong turbulence in the combustion chamber and, as a result, the burning velocity is increased. However, in this engine, while it is true that thermal efficiency is improved, since the combustion chamber and the accumulation chamber are filled with homogeneous mixtures consisting of substantially the same composition, the space around the electrode of the spark plug is also filled with the homogeneous mixture. Consequently, if a lean air-fuel mixture or a mixture containing a large amount of recirculated exhaust gas therein is used, an ease of the ignition by the spark plug cannot be obtained, and sometimes there occurs a problem in that it is necessary to increase the ignition energy in order to obtain easy ignition.

An object of the present invention is to provide an internal combustion engine capable of forming a mixture of an appropriate air-fuel ratio around the electrode of the spark plug at the time of ignition in such a way that the inside of the combustion chamber is stratified by a mixture formed in the accumulation chamber and having an air-fuel ratio which is richer than that of the mixture in the combustion chamber.

According to the present invention, there is provided an internal combustion engine having an intake passage and an exhaust passage, comprising: a cylinder block having a cylinder bore therein; a cylinder head mounted on said cylinder block and having a cavity therein; a piston reciprocally movable in said cylinder bore; a combustion chamber formed between said cylinder head and said piston, said cavity having a port connected to said combustion chamber; an intake valve movably mounted on said cylinder head for leading a suction gas from the intake passage into said combustion chamber; an exhaust valve movably mounted on said cylinder head for discharging an exhaust gas into the atmosphere; means for feeding fuel into said cavity to create a combustible mixture therein; a spark plug having a spark gap located in said combustion chamber, and; valve means for opening said port of the cavity during the compression stroke to spout out a jet of the combustible mixture under pressure into said combustion chamber from said cavity during the first half of the compression stroke and permit the inflow of the suction gas into said cavity from said combustion chamber during the latter half of the compression stroke for temporarily accumulating the suction gas under pressure after said port is closed.

While a stratified combustion engine has been well known, the majority of such conventional stratified combustion engines have a construction such that a rich air-fuel mixture is led to the space around the electrode of the spark plug at the time of the intake stroke, except for an engine having an injection nozzle which is used for directly injecting fuel into the combustion chamber. However, even if the inside of the combustion chamber is stratified by leading the rich air-fuel mixture to the space around the electrode of the spark plug at the time of the intake stroke, since there is a long time interval until the ignition is carried out, it is impossible to continue to maintain the stratified state as it is until the ignition is carried out. In addition, in a conventional stratified combustion engine, since a rich air-fuel mixture containing a large amount of liquid fuel which is not vaporized is fed into the combustion chamber, there occurs a problem in that, particularly in a multi-cylinder engine, a satisfactory distribution of fuel cannot be obtained. According to the present invention, since the inside of the combustion chamber is stratified by the mixture which is spouted from the accumulation chamber in the first half of the compression stroke, it is possible to continue to maintain the stratified state as it is until the ignition is carried out. Consequently, even if a lean air-fuel mixture or a mixture containing a large amount of the recirculated exhaust gas therein is used, easy ignition can be obtained.

The present invention may be more fully understood from the following description of preferred embodiments of the invention, together with the accompanying drawings.

DESCRIPTION OF PREFERRED EMBODIMENTS

Figure 1:
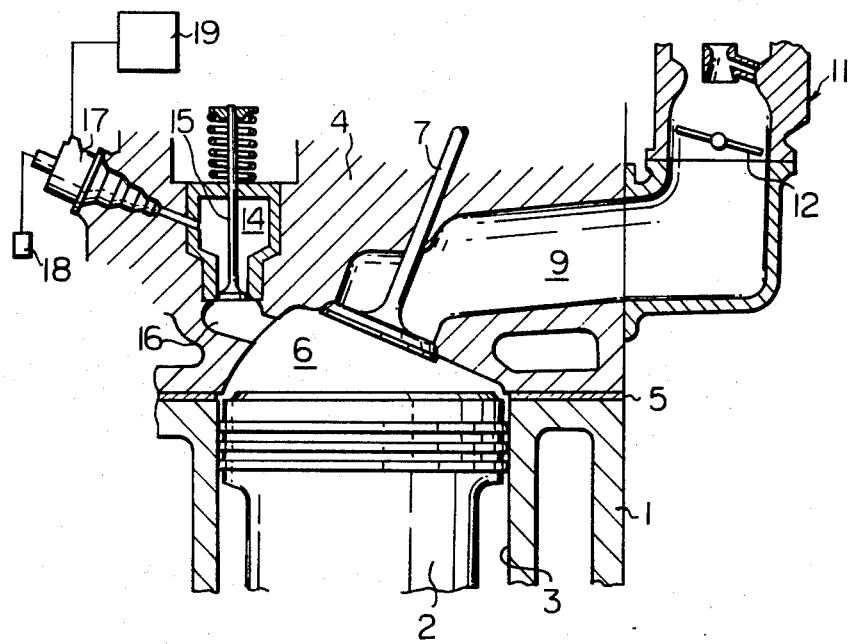
FIG. 1 is a cross-sectional side view of an embodiment of an internal combustion engine according to the present invention.
Figure 2:
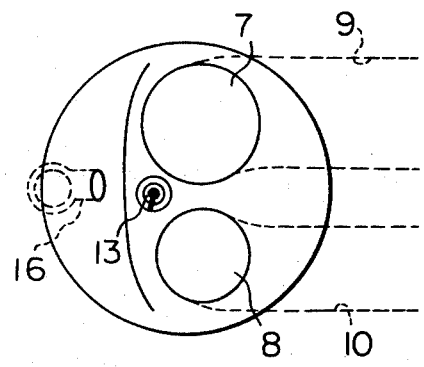
FIG. 2 is a bottom view of the cylinder head illustrated in FIG. 1.

Referring to FIGS. 1 and 2, 1 designates a cylinder block, 2 a piston reciprocally movable in a cylinder bore 3 formed in the cylinder block 1, 4 a cylinder head fixed onto the cylinder block 1 via a gasket 5, and 6 a combustion chamber formed between the piston 2 and the cylinder head 4; 7 designates an intake valve, 8 an exhaust valve, 9 an intake passage and 10 an exhaust passage; 11 designates a carburetor, 12 a throttle valve of the carburetor 11, and 13 a spark plug. As is illustrated in FIG. 1, an accumulation chamber 14 is formed in the cylinder head 4 and connected to a passage 16 via an accumulation valve 15 which is actuated by a valve drive mechanism (not shown). As is illustrated in FIGS. 1 and 2, this passage 16 opens into the wedge shape combustion chamber 6 towards the central portion of the combustion chamber 6. A fuel injector 17 for injecting fuel into the accumulation chamber 14 is mounted on the cylinder head 4 and connected to a fuel pump 18 driven by a motor. In this embodiment, the amount of fuel injected from the fuel injector 17 is controlled by a fuel injection control device 19.

Figure 3:
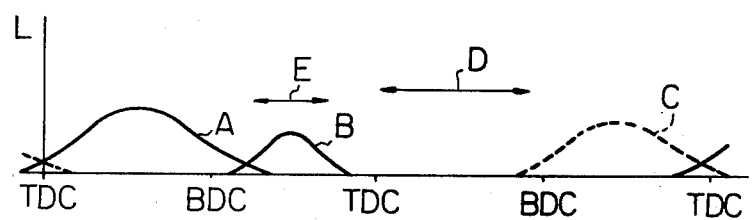
FIG. 3 is a graph illustrating an opening timing of the intake valve, the exhaust valve, and the accumulation valve.

FIG. 3 illustrates the opening timing of the intake valve 7, the exhaust valve 8 and the accumulation valve 15. In FIG. 3, the ordinate L indicates valve lift and the abscissa indicates crank angle. In addition, in FIG. 3, the curved lines A, B and C indicate the opening timing of the intake valve 7, the accumulation valve 15 and the exhaust valve 8, respectively. From FIG. 3, it will be understood that the accumulation valve 15 opens approximately at the beginning of the compression stroke and closes at the end of the compression stroke. Furthermore, in FIG. 3, the arrow D indicates the injecting duration of the fuel injector 17. While the injection timing of the fuel injector 17 can be set at a desired timing, it is preferable that the injection timing be set so that the injecting operation of the fuel injector 17 is started immediately after the accumulation valve 15 closes as indicated by the arrow D in FIG. 3.

In operation, at the time of the intake stroke, a lean air-fuel mixture or a mixture containing a large amount of the recirculated exhaust gas therein is introduced into the combustion chamber 6 via the intake valve 7. After this, when the piston 2 starts the compressing action of the combustible mixture in the combustion chamber 6, the accumulation valve 15 is opened. As is hereinafter described, a combustible mixture under high pressure, which is introduced into the accumulation chamber 14 at the compression stroke in the preceding cycle, is accumulated in the accumulation chamber 14 and, on the other hand, the pressure in the combustion chamber 6 is lower than the atmospheric pressure at the start of the compression stroke. Consequently, the pressure difference between the pressure in the combustion chamber 6 and the accumulation chamber 14 is large and, thus, when the accumulation valve 15 is opened, the combustible mixture accumulated in the accumulation chamber 14 is spouted out into the combustion chamber 6 at a high speed. After this, when the piston 2 moves upwards, pressure in the combustion chamber 6 becomes higher than that in the accumulation chamber 14 and the combustible mixture in the combustion chamber 6 is forced into the accumulation chamber 14. As the compressing action is advanced, the pressure in the combustion chamber 6 is increased and, accordingly, the pressure in the accumulation chamber 14 is also increased. Consequently, the combustible mixture under pressure is accumulated in the accumulation chamber 14 after the accumulation valve 15 closes. Then, the combustible mixture in the combustion chamber 6 is ignited by the spark plug 13, and the combustion process is started. At the same time, as is illustrated by the arrow D in FIG. 3, fuel is injected into the accumulation chamber 14 from the fuel injector 17 after the accumulation valve 15 closes. Since the adiabatic compression is carried out in the accumulation chamber 14 at the time of the compression stroke, the temperature of the combustible mixture in the accumulation chamber 14 becomes quite high and, as a result, the fuel injected from the fuel injector 17 is instantaneously vaporized. Thus, a combustible mixture which is richer than that in the combustion chamber 6 is formed in the accumulation chamber 14. Then, the richer air-fuel mixture thus formed in the accumulation chamber 14 is spouted out into the combustion chamber 6 in the first half of the compression stroke of the next cycle. In the first half of the compression stroke, the piston 2 is positioned at a lower position. Consequently, when the richer mixture is spouted out from the accumulation chamber 14 into the combustion chamber 6, the upper space of the combustion chamber 6 is filled with the richer mixture. As a result of this, the inside of the combustion chamber 6 is stratified. That is, the lower space of the combustion chamber 6 is filled with the lean air-fuel mixture, and the upper space of the combustion chamber 6, in which the spark plug 13 is located, is filled with the richer air-fuel mixture. The richer mixture continues to be spouted from the accumulation chamber 14 during the first half of the compression stroke and, then, the combustible mixture in the combustion chamber 6 is ignited by the spark plug 13 a little while after the spouting operation of the richer mixture is completed, that is, after the stratifying operation is completed. As mentioned above, since the time interval between the completion of the stratifying operation and the ignition is quite short, the stratified state continues to be maintained until the ignition is carried out. Consequently, since the space around the electrode of the spark plug 13 is filled with the richer mixture at the time of ignition, a good ignition can be obtained. In addition, the richer mixture spouted from the accumulation chamber 14 causes a strong turbulence in the combustion chamber 6 and, as a result, the burning velocity is considerably increased.

Figure 4:
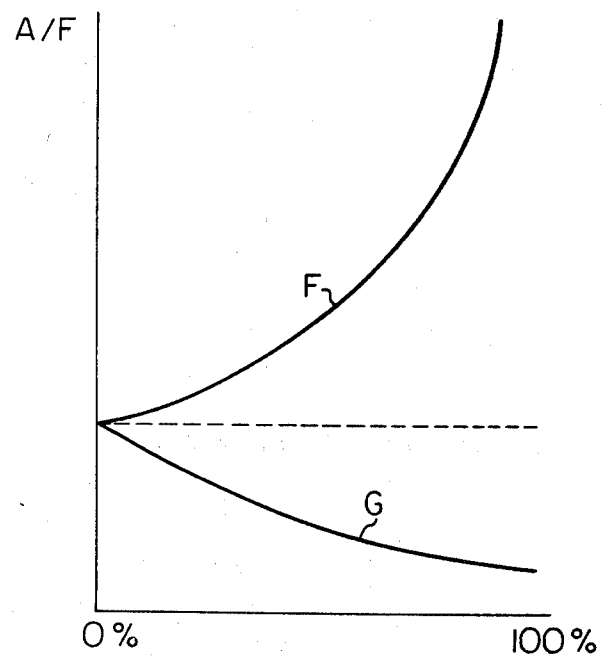
FIG. 4 is a graph illustrating air-fuel ratio of the mixtures formed in the combustion chamber and the accumulation chamber.

FIG. 4 shows the relationship between an air-fuel ratio of the combustible mixture formed in the combustion chamber 6 and an air-fuel ratio of the combustible mixture formed in the accumulation chamber 14, that is, between the amount of fuel fed from the carburetor 11 and the amount of fuel fed from the fuel injector 17. In FIG. 4, the ordinate indicates air-fuel ratio A/F, and the abscissa indicates a ratio of the amount of fuel fed from the fuel injector 17 to the amount of fuel fed from both the carburetor 11 and the fuel injector 17. That is, 0 percent in the abscissa shows the case wherein fuel is fed only from the carburetor 11, and 100 percent in the abscissa shows the case wherein fuel is fed only from the fuel injector 17. In addition, in FIG. 4, the curved line F indicates the mean value of an air-fuel ratio of the mixture formed in the combustion chamber 6, and the curved line G indicates an air-fuel ratio of the mixture formed in the accumulation chamber 14. In an engine according to the present invention, the amount of fuel fed from the carburetor 11 and the fuel injector 17 is so controlled that the mean value of air-fuel ratios of the mixtures formed in the combustion chamber 6 and the accumulation chamber 14 becomes equal to, for example, 16:1, as indicated by the broken line in FIG. 4. Consequently, in the case wherein the engine is provided with both the carburetor 11 and the fuel injector 17, as illustrated in FIG. 1, a leaner mixture which is leaner than a mixture having an air-fuel ratio of 16:1 is fed into the combustion chamber 6, and a richer mixture which is richer than a mixture having an air-fuel ration of 16:1 is formed in the accumulation chamber 14. Then, at the time of the compression stroke, the inside of the combustion chamber 6 is stratified by the above-mentioned richer mixture and leaner mixture. In addition, in order to promote the vaporization of fuel injected from the fuel injector 17, it is preferable that the injecting operation of the fuel injector 17 be completed as soon as possible after the accumulation valve 15 closes as indicated by the arrow D in FIG. 3.

Figure 5:
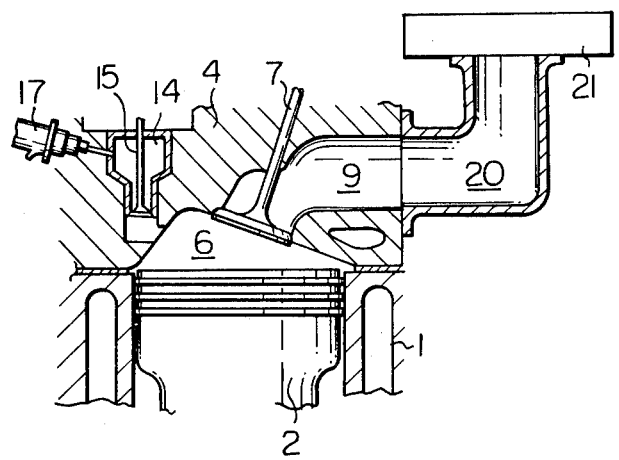
FIG. 5 is a cross-sectional side view of another embodiment according to the present invention.

As mentioned previously, in FIG. 4, 100 percent in the abscissa indicates the case wherein fuel is fed only from the fuel injector 17. Consequently, in this case, it is not necessary to arrange a carburetor and a throttle valve in the intake system as illustrated in FIG. 5 and, thus, the intake passage 9 is directly connected to an air cleaner 21 via an intake passage 20. In this engine, the load of the engine is regulated by the amount of fuel injected from the fuel injector 17. In addition, since the engine has no throttle valve in its intake system, there is no throttling loss and, thus, there is an advantage in that the thermal efficiency is improved.

Figure 6:
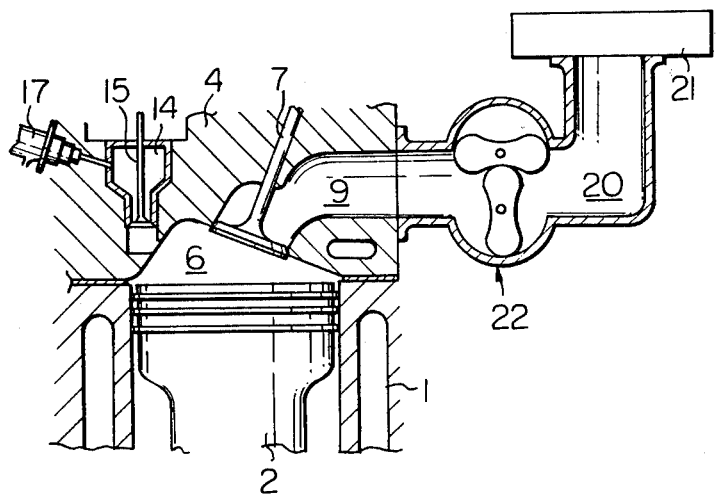
FIG. 6 is a cross-sectional side view of a further embodiment according to the present invention.

In addition, in the case wherein the opening duration of the accumulation valve 15 and the opening duration of the intake valve 7 are partially overlapped, as illustrated in FIG. 3, the volumetric efficiency is reduced. In this case, as is illustrated in FIG. 6, in order to compensate for the reduction of the volumetric efficiency, a supercharger 22 may be arranged in the intake passage 20. In addition, a carburetor (not shown) may be further arranged in the intake passage 20 located upstream of the supercharger 22. In the embodiments illustrated in FIGS. 5 and 6, while only air is introduced into the combustion chamber 6, it is possible to recirculate the exhaust gas into this air. Consequently, in the present invention, an air-fuel mixture, or air, or an air-fuel mixture containing the recirculated exhaust gas therein, or air containing the recirculated exhaust gas therein (such an air-fuel mixture and air are hereinafter referred to as a suction gas) is introduced into the combustion chamber 6. After this, the suction gas is forced into the accumulation chamber 14 and, then, the fuel is injected into the suction gas.

Figure 7:
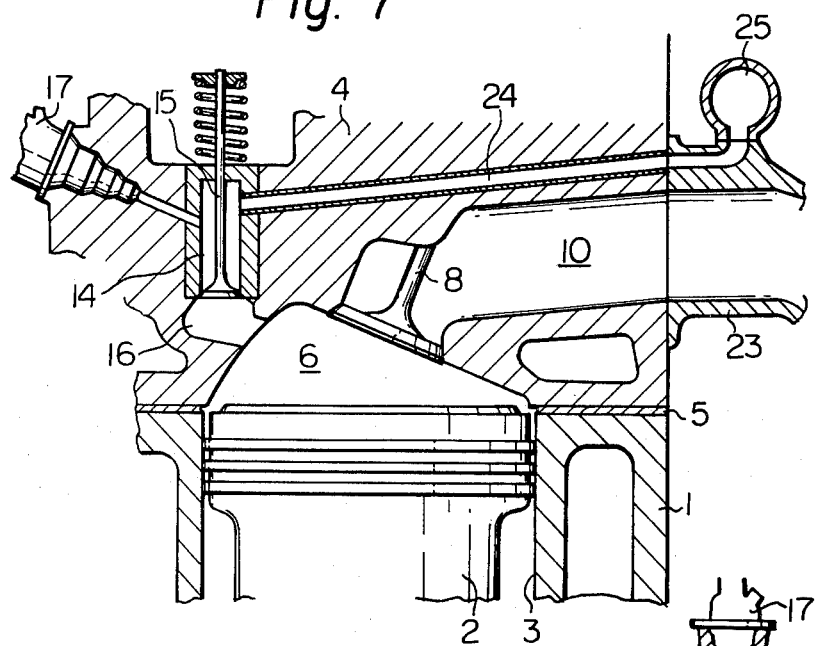
FIG. 7 is a cross-sectional side view of a still further embodiment according to the present invention.

FIG. 7 illustrates another embodiment of the engine illustrated in FIG. 1. Referring to FIG. 7, a long passage 24, having a small cross-sectional area, is formed in the cylinder head 4 and in the outer wall of the exhaust manifold 23, and the accumulation chamber 14 is connected to a sub-accumulation chamber 25 via the long passage 24. In operation, the suction gas forced into the accumulation chamber 14 from the combustion chamber 6 flows in the passage 24 at a high speed and is fed into the sub-accumulation chamber 25 in the latter half of the compression stroke. Then, the suction gas accumulated in the sub-accumulation chamber 25 flows again in the passage 24 at a high speed and is spouted out from the accumulation chamber 14 into the combustion chamber 6 in the first half of the compression stroke of the next cycle. In this embodiment, since the suction gas flows at a high speed in the passage 24, the flow energy is fed into this suction gas and, as a result, the vaporization of fuel is promoted. In addition, in order to further promote the vaporization of fuel, it is preferable that the passage 24 be arranged at a position near the exhaust passage 10. In the embodiment illustrated in FIG. 7, since a satisfactory vaporization of the fuel is obtained, a good ignition and combustion can be obtained.

Figure 8:
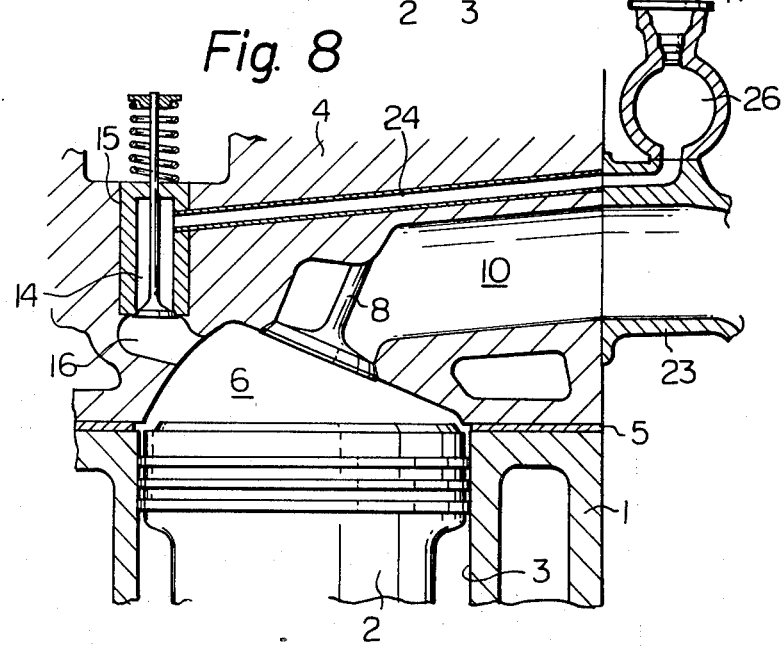
FIG. 8 is a cross-sectional side view of a still further embodiment according to the present invention.

FIG. 8 illustrates another embodiment of the engine illustrated in FIG. 7. In this embodiment, each of the passages 24 which are provided for the corresponding cylinders of the engine is connected to a common sub-accumulation chamber 26, and the single fuel injector 17 is arranged in the common sub-accumulation chamber 26. In this embodiment, since it is not necessary to arrange a plurality of the fuel injectors, the construction of the engine is simplified. In addition, since the fuel is fed into each of the accumulation chambers 14 from the common sub-accumulation chamber 26, a good distribution of the fuel can be obtained.

Figure 9:
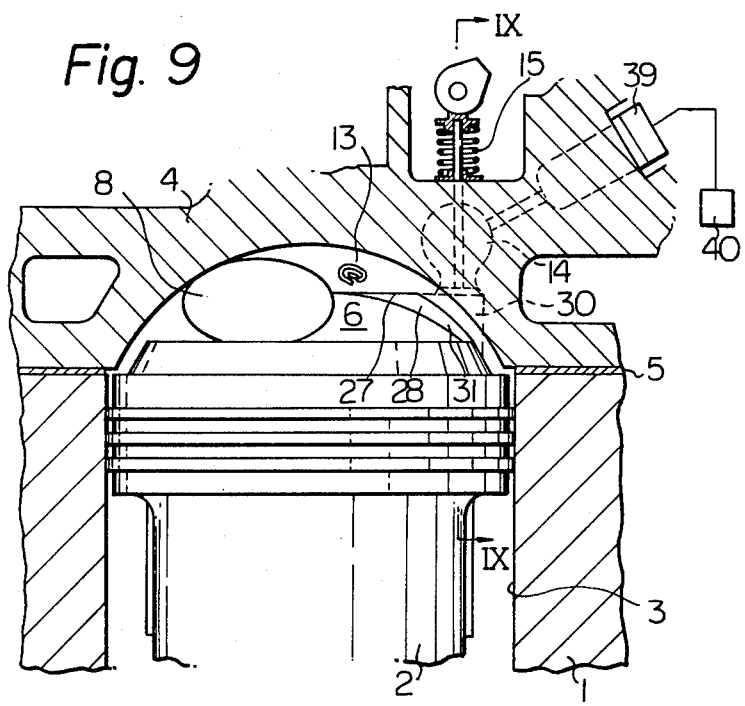
FIG. 9 is a cross-sectional side view of a still further embodiment according to the present invention.
Figure 10:
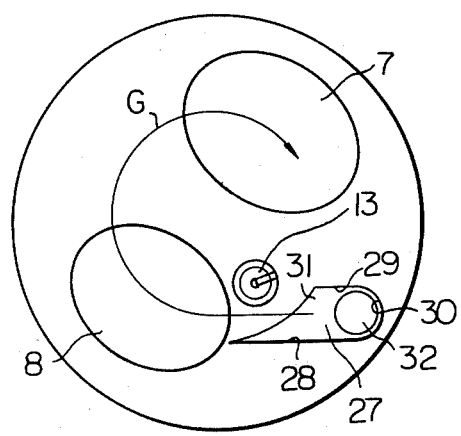
FIG. 10 is a bottom view of the cylinder head shown in FIG. 9.
Figure 11:
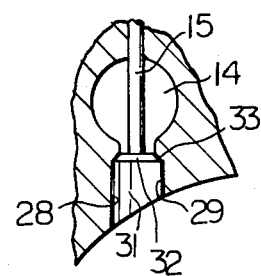
FIG. 11 is a cross-sectional view taken along the line IX—IX in FIG. 9.

FIGS. 9 through 11 illustrate a further embodiment of the engine illustrated in FIG. 1. Referring to FIGS. 9 through 11, a groove 31, defined by a horizontal wall 27, a pair of vertical walls 28, 29 and a semi-cylindrical wall 30, is formed on the semi-spherical inner wall of the cylinder head 4. The valve head 32 of the accumulation valve 15 is arranged to be exposed to the inside of the groove 31. In addition, as is illustrated in FIG. 10, the semi-cylindrical wall 30 is arranged at a position closely adjacent to the peripheral edge of the valve head 32 so that, when the accumulation valve 15 remains open, the suction gas in the combustion chamber 6 flows into the accumulation chamber 14 via an opening formed between the valve head 32 and the valve seat 33, at a position located in the left side in FIG. 2; or the richer mixture in the accumulation chamber 14 flows into the combustion chamber 6 via the above-mentioned opening. In addition, as is illustrated in FIG. 10, the groove 31 is formed so as to extend in the circumferential direction of the combustion chamber 6, so that the richer mixture flowing into the combustion chamber 6 from the accumulation chamber 14 causes a swirl motion indicated by the arrow G in the upper interior of the combustion chamber 6. Consequently, the inside of the combustion chamber 6 is stratified by the suction gas located in the lower interior of the combustion chamber 6 and by the richer mixture swirling in the upper interior of the combustion chamber 6. As a result of this, a good ignition can be obtained, and the burning velocity is considerably increased because the swirl motion is created in the upper interior of the combustion chamber 6. In addition, as is illustrated in FIG. 10, it is preferable that the spark plug 13 be located on the extension of the groove 31 at a position near the groove 31 so that the richer mixture spouted from the accumulation chamber 14 reaches the space around the electrode of the spark plug 13. Furthermore, by arranging the exhaust valve 8 on the extension of the groove 31 as illustrated in FIG. 10, the vaporization of the liquid fuel in the richer mixture spouted from the accumulation chamber 14 is promoted and, at the same time, the exhaust valve 8 is cooled by the richer mixture. In this embodiment, an automatically opened fuel feed valve 39 is used instead of using the fuel injector 17 as illustrated in FIG. 1, and this fuel feed valve 39 is connected to the fuel tank 40. The fuel feed valve 39 is equipped with, for example, a check valve so that, when the pressure in the accumulation chamber 14 becomes lower than that in the fuel tank 40, the check valve is automatically opened to feed fuel from the fuel tank 40 into the accumulation chamber 14.

At the beginning of the compression stroke, a vacuum is produced in the combustion chamber 6. On the other hand, as the richer mixture is spouted from the accumulation chamber 14, the pressure in the accumulation chamber 14 is gradually reduced and, then, a vacuum is produced in the accumulation chamber 14 immediately before the spouting operation of the richer mixture is stopped. The vacuum in the accumulation chamber 14 remains for a while after the inflow of suction gas from the combustion chamber 6 into the accumulation chamber 14 is started. Consequently, in this interim, as is indicated by the arrow E in FIG. 3, the fuel feed valve 39 is automatically opened to feed fuel from the fuel tank 40 into the accumulation chamber 14. In this engine, the level of vacuum in the accumulation chamber 14 is increased as the level of the load of the engine is reduced. In addition, the length of time during which a vacuum is produced in the accumulation chamber 14 becomes long as the speed of the engine is reduced. Consequently, the amount of fuel fed into the accumulation chamber 14 from the fuel tank 40 when the engine is operating at a low speed under a light load is larger than in the case wherein the engine is operating at a high speed under a heavy load. In the embodiment illustrated in FIG. 9, the fuel in the fuel tank 40 is maintained at atmospheric pressure. However, the fuel in the fuel tank 40 may be maintained under pressure. In addition, in this embodiment, the amount of fuel fed into the accumulation chamber 14 from the fuel tank 40 can be increased by increasing the pressure of the fuel in the fuel tank 40 and by increasing the pressure at which the opening operation of the check valve is carried out.

Figure 12:
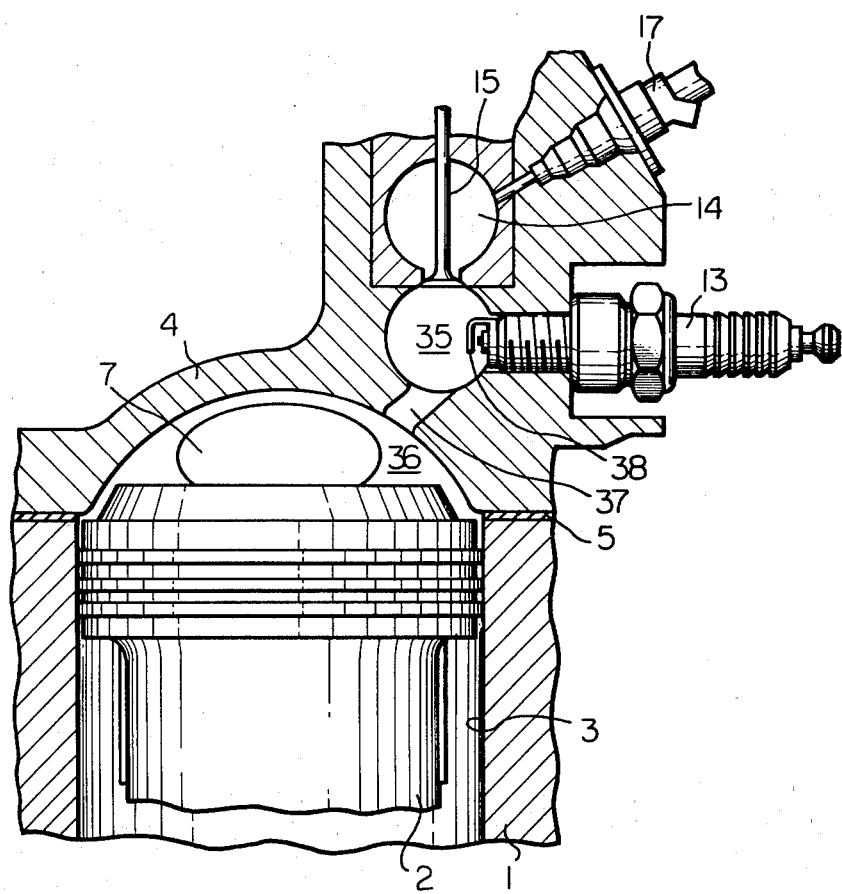
FIG. 12 is a cross-sectional side view of a still further embodiment according to the present invention.

FIG. 12 illustrates the case wherein the present invention is applied to an engine equipped with an auxiliary combustion chamber. In FIG. 12, similar components are indicated with the same reference numerals as used in FIG. 1. Referring to FIG. 12, a combustion chamber comprises a main combustion chamber 36 and an auxiliary combustion chamber 35 which are interconnected to each other via a connecting passage 37. The electrode 38 of the spark plug 13 is disposed in the auxiliary combustion chamber 35, and the connecting passage 37 is arranged so that the opening of the connecting passage 37 is directed to the top surface of the piston 2. The accumulation chamber 14 is arranged in tandem above the auxiliary combustion chamber 35 and connected to the auxiliary combustion chamber 35 via the accumulation valve 15. The opening and closing timing of this valve 15 is the same as that of the accumulation valve 15 illustrated in FIG. 1.

In the embodiment illustrated in FIG. 12, when the accumulation valve 15 is opened, the richer mixture under high pressure, which is accumulated in the accumulation chamber 14, is spouted out into the main combustion chamber 36 via the auxiliary combustion chamber 35 and the connecting passage 37 and, as a result, a strong turbulence is created in the main combustion chamber 236. At this time, the inside of the auxiliary combustion chamber 35 is scavenged by the richer mixture spouted out from the accumulation chamber 14 and, at the same time, the inside of the auxiliary combustion chamber 35 is filled with the richer mixture. In this embodiment, the mixture which is richer than that in the main combustion chamber 36 is formed in the auxiliary combustion chamber 35 and, thus, the inside of the combustion chamber is stratified. After this, when the piston 2 moves upwards, the pressure in the main combustion chamber 36 becomes larger than that in the accumulation chamber 14 and, as a result, the suction gas in the main combustion chamber 36 flows into the accumulation chamber 14 via the connecting passage 37 and the auxiliary combustion chamber 35. At this time, the richer mixture in the auxiliary combustion chamber 35 is diluted by the suction gas flowing into the auxiliary combustion chamber 35 and, as a result, a mixture having an air-fuel ratio which is suitable for obtaining an easy ignition is created in the auxiliary combustion chamber 35. When the accumulation valve 15 is closed, the suction gas under high pressure is accumulated in the accumulation chamber 14. After this, the mixture in the auxiliary combustion chamber 35 is ignited by the spark plug 13 and, then, the flame of the mixture thus ignited is spouted out into the main combustion chamber 36 via the connecting passage 37. As mentioned above, a strong turbulence is created before the flame is spouted out into the main combustion chamber 36. Consequently, when the jet of flame is spouted out into the main combustion chamber 36, the strong turbulence is further strengthened by the flame. As a result of this, since an extremely strong turbulence is caused in the main combustion chamber 36, the burning velocity is remarkably increased.

Figure 13:
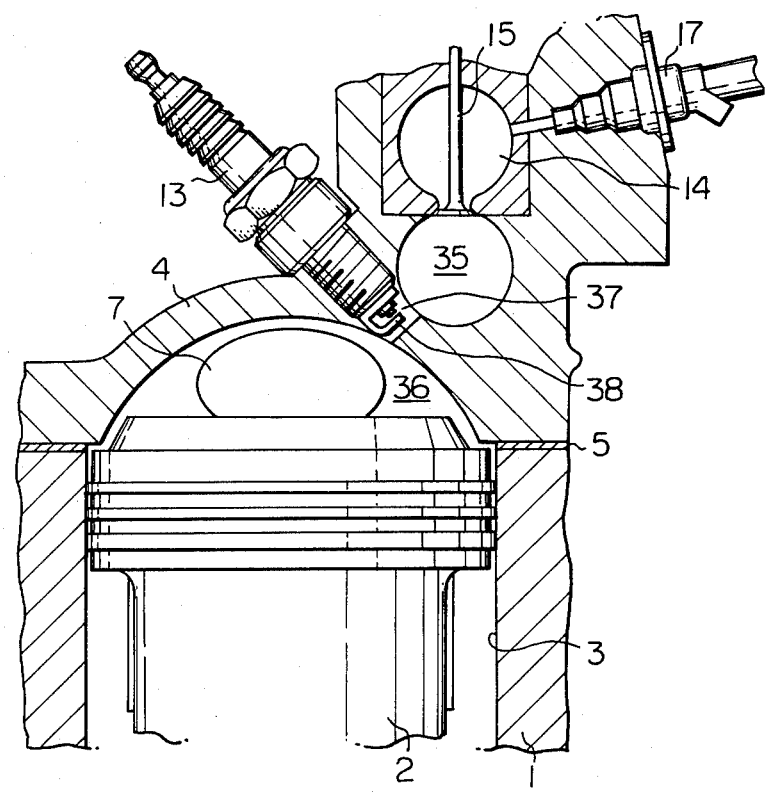
FIG. 13 is a cross-sectional side view of a still further embodiment according to the present invention.

FIG. 13 illustrates another embodiment of an engine illustrated in FIG. 12. Referring to FIG. 13, the electrode 38 of the spark plug 13 is arranged in the connecting passage 37. In this embodiment, since the electrode 38 of the spark plug 13 is directly exposed to the stream of the richer mixture spouted out into the main combustion chamber 36 from the accumulation chamber 14 and to the stream of the suction gas flowing into the accumulation chamber 14 from the main combustion chamber 36, the scavenging operation of the electrode 38 is considerably improved.

According to the present invention, since the inside of the combustion chamber is stratified so that the richer mixture is formed around the electrode of the spark plug, a good ignition can be obtained. In addition, since the adiabatic compression is carried out in the accumulation chamber at the time of the compression stroke, the temperature of suction gas forced into the accumulation chamber becomes quite high and, as a result, the vaporization of fuel in the accumulation chamber is promoted. Particularly when the engine is started, the temperature of the suction gas in the accumulation chamber is rapidly increased and becomes high. As a result of this, the vaporization of fuel in the accumulation chamber is promoted and, thus, even before the warm-up of the engine is completed, a good ignition can be obtained. In addition, since the vaporization of fuel in the accumulation chamber is promoted to a considerable extent the combustion is not affected by differences in volatility of fuel, and a multi-fuel can be used. Furthermore, since a strong turbulence is created in the combustion chamber by the richer mixture spouted from the accumulation chamber, the burning velocity is increased and, thus, a stable combustion can be obtained. In addition, since the maximum pressure in the accumulation chamber is at most 5 through 6 kg/cm$^2$, a valve for low pressure can be used as a fuel injector or an automatically opened fuel feed valve. In the case wherein a fuel injector is used, since the accumulation valve remains closed for a long time, there is an advantage in that the injection timing of the fuel injector can be easily controlled.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine having an intake passage and an exhaust passage, comprising:
   a cylinder block having a cylinder bore therein;
   a cylinder head mounted on said cylinder block and having a fixed-volume, non-cooled cavity therein;
   a piston reciprocally movable in said cylinder bore;
   a combustion chamber formed between said cylinder head and said piston, said cavity having a port connected to said combustion chamber;
   an intake valve movably mounted on said cylinder head for leading a suction gas from the intake passage into said combustion chamber;
   an exhaust valve movably mounted on said cylinder head for discharging an exhaust gas into the atmosphere;
   means for feeding fuel into said cavity to create a combustible mixture therein, said feeding means comprising a fuel injector;
   a spark plug having a spark gap located in said combustion chamber;
   valve means for opening said port of the cavity once per cycle during the compression stroke to spout out a jet of the combustible mixture under pressure into said combustion chamber from said cavity during the first half of the compression stroke and permit the inflow of the suction gas into said cavity from said combustion chamber during the latter half of the compression stroke for temporarily accumulating the suction gas under pressure after said port is closed; and
   a fuel injection control device for starting the injecting operation of said fuel injector immediately after said valve means is closed.

2. An internal combustion engine having an intake passage and an exhaust passage, comprising:
   a cylinder block having a cylinder bore therein;
   a cylinder head mounted on said cylinder block and having a fixed-volume, non-cooled cavity therein;
   a piston reciprocally movable in said cylinder bore;
   a combustion chamber formed between said cylinder head and said piston, said cavity having a port connected to said combustion chamber;
   an intake valve movably mounted on said cylinder head for leading a suction gas from the intake passage into said combustion chamber;
   an exhaust valve movably mounted on said cylinder head for discharging an exhaust gas into the atmosphere;
   means for feeding fuel into said cavity to create a combustible mixture therein, said feeding means comprising a fuel feed valve which opens automatically when the pressure in said cavity is reduced below a predetermined level;
   a spark plug having a spark gap located in said combustion chamber; and
   valve means for opening said port of the cavity once per cycle during the compression stroke to spout out a jet of the combustible mixture under pressure into said combustion chamber from said cavity during the first half of the compression stroke and permit the inflow of the suction gas into said cavity from said combustion chamber during the latter half of the compression stroke for temporarily accumulating the suction gas under pressure after said port is closed.

3. An internal combustion engine as claimed in claim 2, wherein said fuel feed valve comprises a check valve which opens when a vacuum is produced in said cavity.

4. An internal combustion engine having an intake passage and an exhaust passage comprising:
   a supercharger in the intake passage;
   a cylinder block having a cylinder bore therein:
   a cylinder head mounted on said cylinder block and having a fixed-volume, non-cooled cavity therein;
   a piston reciprocally movable in said cylinder bore;
   a combustion chamber formed between said cylinder head and said piston, the intake passage being directly connected to the atmosphere for feeding air into said combustion chamber, and said cavity having a port connected to said combustion chamber;
   an intake valve movably mounted on said cylinder head for leading a suction gas from the intake passage into said combustion chamber;
   an exhaust valve movably mounted on said cylinder head for discharging an exhaust gas into the atmosphere;
   means for feeding fuel into said cavity to create a rich combustible mixture therein;
   a spark plug having a spark gap located in said upper interior of the combustion chamber; and
   valve means for opening said port of the cavity once per cycle during the compression stroke to spout out a jet of the combustible mixture under pressure into said combustion chamber from said cavity during the first half of the compression stroke and permit the inflow of the suction gas into said cavity from said combustion chamber during the latter half of the compression stroke for temporarily accumulating the suction gas under pressure after said port is closed, wherein said port of the cavity is directed to an upper interior of said combustion chamber for stratifying the inside of the combustion chamber so as to collect said rich combustible mixture in said upper interior and collect said suction gas in a lower interior of said combustion chamber.

5. An internal combustion engine having an intake passage and an exhaust passage, comprising:
- a cylinder block having a plurality of cylinder bores therein;
- a cylinder head mounted on said cylinder block and having a common accumulation chamber therein and a fixed-volume, non-cooled cavity for each cylinder in the cylinder block, said cavities being interconnected to each other, and each of said cavities being connected to said common accumulation chamber;
- a piston reciprocally movable in each cylinder bore;
- a combustion chamber formed between said cylinder head and each piston, each of said cavities having a port connected to its respective combustion chamber;
- an intake valve for each cylinder movably mounted on said cylinder head for leading a suction gas from the intake passage into each combustion chamber;
- an exhaust valve for each cylinder movably mounted on said cylinder head for discharging an exhaust gas from each cylinder into the atmosphere;
- means for feeding fuel into each cavity to create a combustible mixture therein, said feeding means comprising a fuel injector located in the common accumulation chamber;
- a spark plug for each cylinder, each spark plug having a spark gap located in the corresponding combustion chamber; and
- valve means for opening the port of each cavity once per cycle during the compression stroke of the corresponding piston to spout out a jet of the combustible mixture under pressure into the corresponding combustion chamber from said each cavity during the first half of the compression stroke of the corresponding piston and permit the inflow of the suction gas into said each cavity from its combustion chamber during the latter half of said compression stroke for temporarily accumulating the suction gas under pressure after said port is closed.

6. An internal combustion engine as claimed in claim 5, wherein each of said cavities is connected to said common accumulation chamber via a respective long passage having a small cross-sectional area.

7. An internal combustion engine as claimed in claim 6, wherein said passage is arranged at a position near the exhaust passage.

8. An internal combustion engine having an intake passage and an exhaust passage, comprising:
- a cylinder block having a cylinder bore therein;
- a cylinder head mounted on said cylinder block and having a fixed-volume, non-cooled cavity therein;
- a piston reciprocally movable in said cylinder bore;
- a combustion chamber formed between said cylinder head and said piston, said cavity having a port connected to said combustion chamber, and wherein said combustion chamber comprises a main combustion chamber and an auxiliary combustion chamber which is arranged between said main combustion chamber and said cavity, said auxiliary combustion chamber being connected to said main combustion chamber via a connecting passage;
- an intake valve movable mounted on said cylinder head for leading a suction gas from the intake passage into said combustion chamber;
- an exhuast valve movably mounted on said cylinder head for discharging an exhaust gas into the atmosphere;
- means for feeding fuel into said cavity to create a combustible mixture therein;
- a spark plug having a spark gap located in said connecting passage between the auxiliary combustion chamber and the main combustion chamber; and
- valve means arranged between said cavity and said auxiliary combustion chamber for opening said port of the cavity once per cycle during the compression stroke to spout out a jet of the combustible mixture under pressure into said combustion chamber from said cavity during the first half of the compression stroke and permit the inflow of the suction gas into said cavity from said combustion chamber during the latter half of the compression stroke for temporarily accumulating the suction gas under pressure after said port is closed.

* * * * *

UNITED STATES PATENT AND TRADEMARK OFFICE
CERTIFICATE OF CORRECTION

Page 1 of 2

PATENT NO. : 4,210,105
DATED : July 1, 1980
INVENTOR(S) : Hidetake Nohira, et al.

It is certified that error appears in the above—identified patent and that said Letters Patent is hereby corrected as shown below:

In the Title:

Change "Internal Combustion Engine Injected Accumulation Chamber" to --Internal Combustion Engine With Fuel-Injected Accumulation Chamber--.

Column 1; Change Title from "Internal Combustion Engine Injected Accumulation Chamber" to --Internal Combustion Engine With Fuel-Injected Accumulation Chamber--.

Column 3, line 29, change "cyl-" to --cy-linder--.

Column 7, line 14, change "thevaporization" to --the vaporization

Column 8, line 16, change "236" to --36--.

UNITED STATES PATENT AND TRADEMARK OFFICE
CERTIFICATE OF CORRECTION

PATENT NO. : 4,210,105
DATED : July 1, 1980
INVENTOR(S) : Hidetaka Nohira, et al.

It is certified that error appears in the above—identified patent and that said Letters Patent is hereby corrected as shown below:

Column 10, line 34, change "therein:" to --therein;--.

Column 12, line 22, change "movable" to --movably--.

Signed and Sealed this

Sixteenth Day of December 1980

[SEAL]

Attest:

SIDNEY A. DIAMOND

Attesting Officer

Commissioner of Patents and Trademarks